US 6,671,368 B1

(12) United States Patent
Contino et al.

(10) Patent No.: US 6,671,368 B1
(45) Date of Patent: Dec. 30, 2003

(54) SERVICE DESK SYSTEM FOR ALLOWING EASILY CHANGEABLE ASSOCIATIONS FOR DATA RETRIEVAL AND DISPLAY

(75) Inventors: Salvatore J. Contino, Livermore, CA (US); Mei Ling, Santa Clara, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 679 days.

(21) Appl. No.: 09/607,671

(22) Filed: Jun. 30, 2000

(51) Int. Cl.$^7$ ................................................ H04M 3/00
(52) U.S. Cl. ................................ 379/265.09; 379/266.1
(58) Field of Search ........................ 379/265.01, 266.01, 379/265.09, 266.1

(56) References Cited

U.S. PATENT DOCUMENTS 6,330,327 B1 * 12/2001 Lee et al. ................. 379/266.1
6,345,094 B1 * 2/2002 Khan et al. .............. 379/266.07

FOREIGN PATENT DOCUMENTS

WO    WO 99/03247    1/1999

* cited by examiner

Primary Examiner—Creighton Smith
(74) Attorney, Agent, or Firm—Silicon Valley IP Group, PC; Kevin J. Zilka; Christopher J. Hamaty

(57) ABSTRACT

A system, method and computer program product are provided for retrieving records in, for example, a computer telephony integration (CTI) architecture. Initially, a telephone call is received from a user. During the telephone call, an identifier associated with the user is ascertained. Information associated with the user is then retrieved utilizing the identifier. The retrieval of information is based on criterion that is customizable.

19 Claims, 5 Drawing Sheets

| CLIENT RECORD TABLE | |
|---|---|
| IDENTIFIER 1 | DESCRIPTION 1 |
| IDENTIFIER 2 | DESCRIPTION 2 |
| IDENTIFIER 3 | DESCRIPTION 3 |
| ⋮ | ⋮ |

Figure 4

SERVICE DESK SYSTEM FOR ALLOWING EASILY CHANGEABLE ASSOCIATIONS FOR DATA RETRIEVAL AND DISPLAY

FIELD OF THE INVENTION

The present invention relates to computer telephony integration (CTI), and more particularly to allowing users to customize and upgrade CTI's.

BACKGROUND OF THE INVENTION

The telephone is among the most widely used communication equipment in the world. At first, telephones were merely convenient tools to allow people to communicate while physically separated. More recently, many people and organizations use telephones to market products and services, to provide technical support for consumer products, to allow callers to access their own financial data, and so forth. Thus, telephone is becoming a major business and marketing tool.

In order to more effectively use telephones systems for business and marketing purposes, call centers have been developed. In a call center, a number of agents handle telephone communication with callers. The matching of calls between callers and agents is typically performed by software operating in conjunction with computerized switching equipment.

A simple example is used here to describe a few of the many advantages of using call centers. When a call is made to a call center, the telephone number of the calling line is typically made available to the call center by a telephone carrier. Based on this telephone number, software in the call center can access a database server to obtain information about the caller, using the caller's phone number as a key. The software routes the incoming call to an agent who can best handle the call based on predefined criterion (e.g., language skill, knowledge of products the caller bought, etc.). The software also causes the information about the caller, retrieved from the database, to be immediately transferred to a computer screen used by the agent. Thus, the agent can gain valuable information about the caller as the call is terminated, or even prior to receiving the call. As a result, the agent can more effectively handle the telephone transaction.

It can be seen from the above example that the enabling technology requires a combination of telephone switching and computer information processing technologies. The term commonly used for such combined technology is computer-telephony-integration (CTI).

In the past, various applications have been developed in association with the computer information processing technologies of CTI. Such applications are often referred to as service desk software. In use, the service desk software facilitates -access to data in a database that is accessible during a telephone call. As mentioned earlier, the data is identified in the database automatically by first ascertaining the identity of a caller using a telephone switch. With this information and under the direction of the service desk software, an operator may access desired data pertinent to providing a particular type of customer service.

Often, the hardware associated with the telephone switching and computer information processing technologies may be implemented in various environments for different business purposes. In each of these different business situations, however, particular service desk software frequently must be written for tailoring to the needs of the particular application of the CTI. For example, the type of data and method of accessing the same may be different for a credit card company customer service call center, a merchandise purchasing call center, etc. This continuous need to develop specific software for specific tasks leads to significant costs. Further, the time involved in such a task is also problematic.

There is thus a need for service desk software that allows customizable use of CTI hardware for particular business environments in an efficient, cost-effective manner.

DISCLOSURE OF THE INVENTION

A system, method and computer program product are provided for retrieving records in, for example, a computer telephony integration (CTI) architecture. Initially, a telephone call is received from a user. During the telephone call, an identifier associated with the user is ascertained. Information associated with the user is then retrieved utilizing the identifier. In use, the retrieval of the information is based on criterion that is customizable. By allowing the customization of the retrieval of information, an efficient and cost-effective system is provided for specifically tailoring CTI architecture for use in particular business environments.

In a preferred embodiment, the identifier may be stored in a database. As an option, the criterion may be customizable via a graphical user interface. By this design, various visual tools such as pull-down menus, etc. may be employed to facilitate the customization process. In one aspect of a preferred embodiment, the criterion may customizable by allowing the selection of one of a plurality of sets of predetermined criterion. Each set may be representative of a predetermined group of users.

In another preferred embodiment, the retrieved information may be displayed. Further, the information may be displayed based on the customizable criterion. As an option, various pop-up windows may be employed in a customized fashion for displaying the information.

In still another preferred embodiment, the criterion may specify which information is retrieved using the identifier. Such information may be retrieved from a record table. In such embodiment, the criterion may specify which of a plurality of record tables are to be accessed to retrieve the information.

As an option, the user may be prompted to input the identifier based on the customizable criterion. Such identifier may be of any type including, but not limited to a social security number, telephone number, or any other identifier unique to the user.

BRIEF DESCRIPTION OF THE DRAWINGS

FIG. 4 illustrates an exemplary record table in accordance with one preferred embodiment.

DESCRIPTION OF THE PREFERRED EMBODIMENTS

Figure 1:
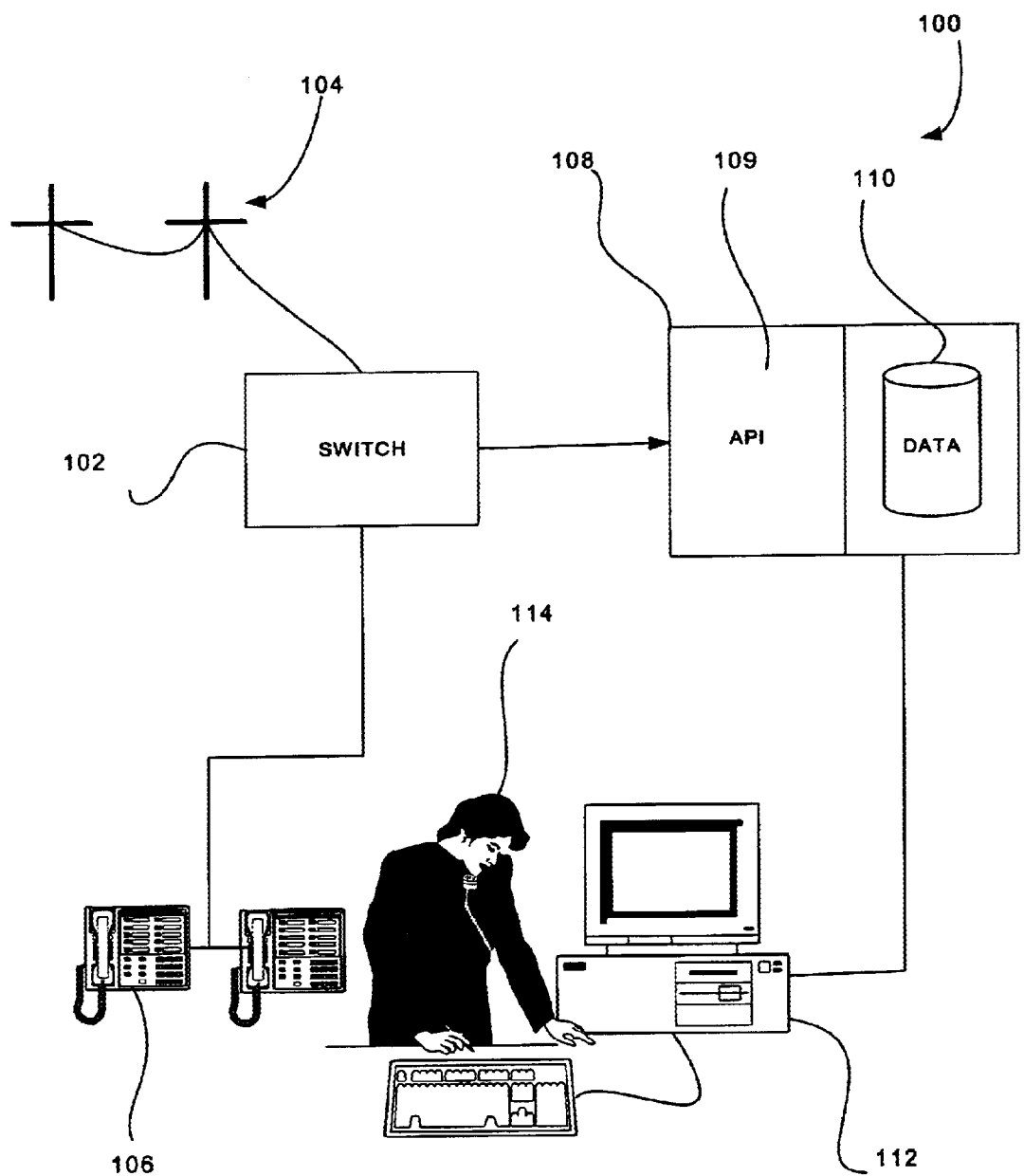
FIG. 1 illustrates a computer telephony integration (CTI) system in accordance with a preferred embodiment.

FIG. 1 illustrates a computer telephony integration (CTI) system 100 in accordance with a preferred embodiment. As shown, a telephone switch 102 is provided which is adapted to receive telephone calls from a telecommunication network 104. The switch 102 may include any commercially available switch manufactured by Lucent®, Nortel®, etc.

Coupled to the switch 102 is at least one telephone 106 for taking the calls received by the telephone switch 102.

Also included is a server 108 which is coupled to the switch 102. In order to properly interface with the switch 102, the server 108 includes an application program interface 109 for translating the various commands associated with the switch 102 and server 108. The server further includes a database 110 in order to store data for purposes that will become apparent hereinafter. Also provided is a plurality of computer workstations 112 that are coupled to the server 108 for accessing and storing data therein.

During use, the server 108 is capable of running a service desk software application that facilitates accessing and storage of data at the server 108 using the computer workstations 112. In various embodiments, different components of the service desk software application may be run on the server 108 and/or the computer workstations 112 per the desires of the user. It should be noted that the aforementioned application program interface 109 tailors its translation of commands for allowing the service desk software application to run with a particular type of switch 102. One possible service desk software application that may be run on the server 108 is Magic® which is manufactured by Network Associates Inc.®

Together, the various components shown in FIG. 1 form a call center that may be used to handle telephone calls and maintain data for a variety of purposes. In the call center, operators 114 may be employed for utilizing the telephones 106 and computer workstations 112 of the current embodiment. While the present CTI architecture has been set forth, it should be noted that the principles set forth herein may be applied to any type of system including any or all of the foregoing components.

Figure 2:
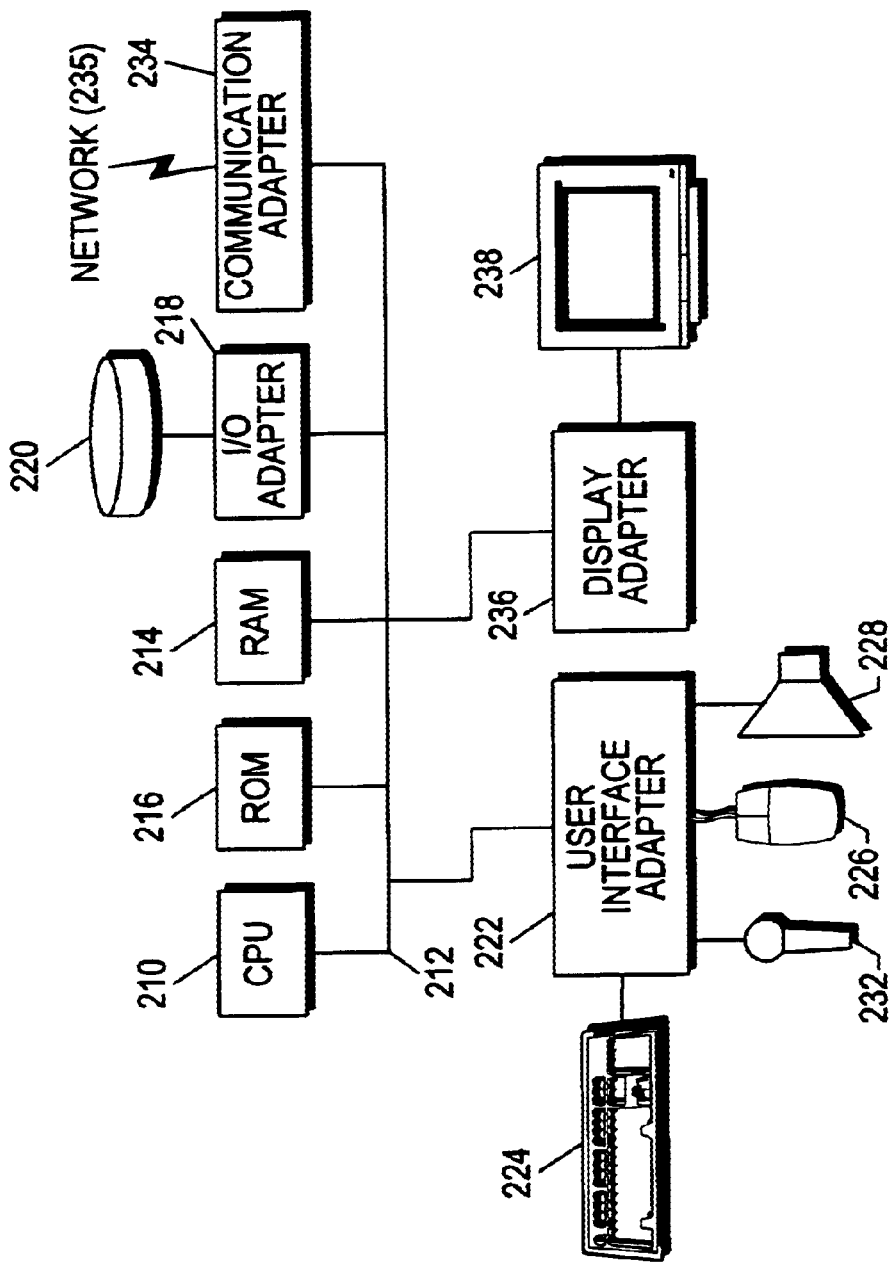
FIG. 2 shows a representative hardware environment associated with the computer workstations shown in FIG. 1.

FIG. 2 shows a representative hardware environment associated with the computer workstations 112 shown in FIG. 1. Such figure illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
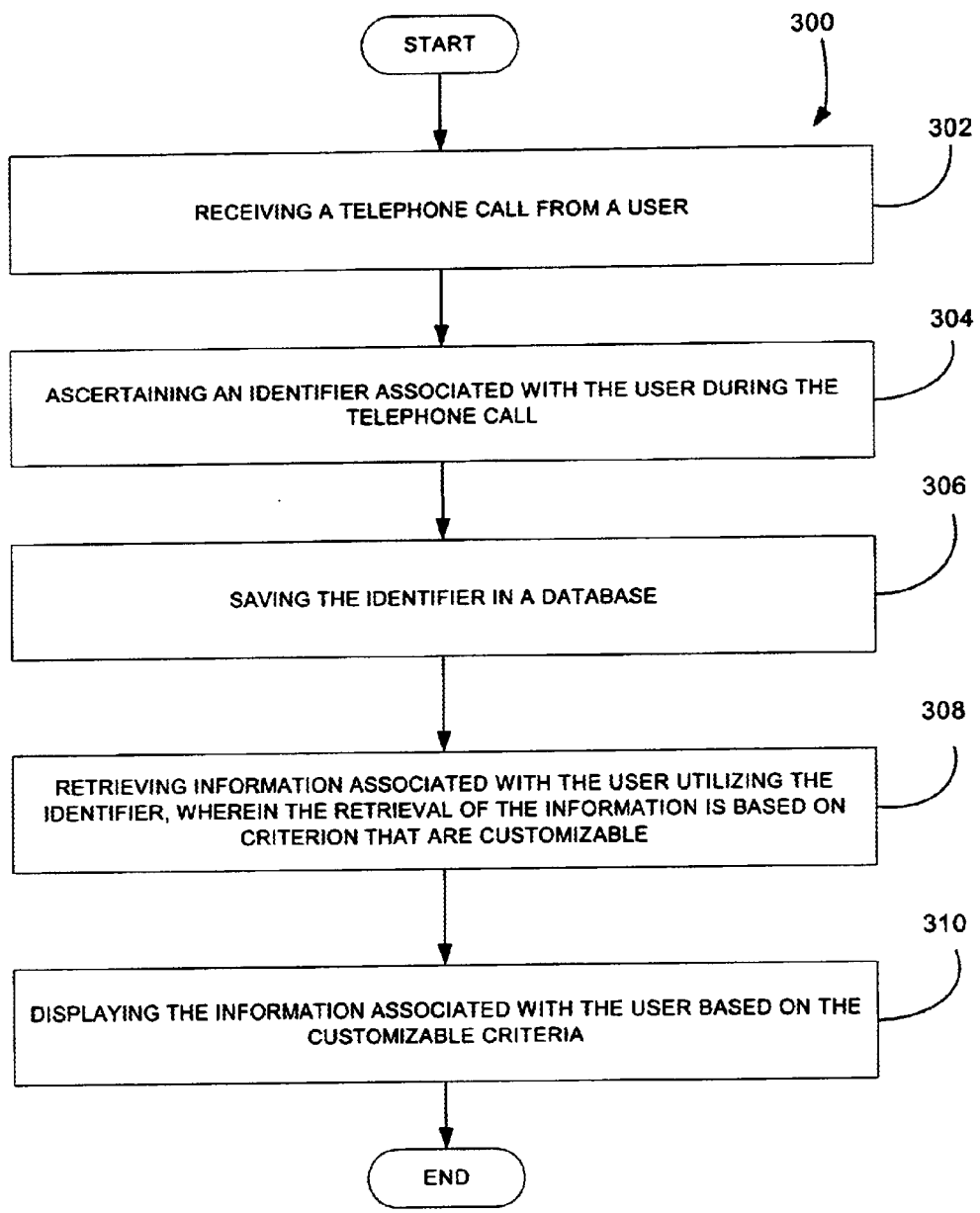
FIG. 3 shows steps taken for retrieving records using the CTI architecture of FIG. 1.

FIG. 3 illustrates a method 300 for retrieving records using the CTI architecture of FIG. 1. In operation 302, a telephone call is received at the switch 102 from a calling party user. During the telephone call, an identifier associated with the user is ascertained. See operation 304. Such identifier may be of any type including, but not limited to a social security number, telephone number, credit card number, or any other identifier at least partly unique to the user.

It should be noted that the identifier may be automatically or manually ascertained. For example, the identifier may include information available from the telephone call, e.g. caller I.D. In the alternative, the switch 102 may be capable of prompting the user to enter an identifier. In such embodiment, the identifier may be received from the user by way of a telephone touch pad, voice recognition, etc. These various types of entry may also be facilitated using the service desk software application running on the server 108.

Thereafter, such identifier may optionally be saved or logged in the database 110 in operation 306. Information associated with the user may then be retrieved utilizing the identifier, as indicated in operation 308.

Figure 4:
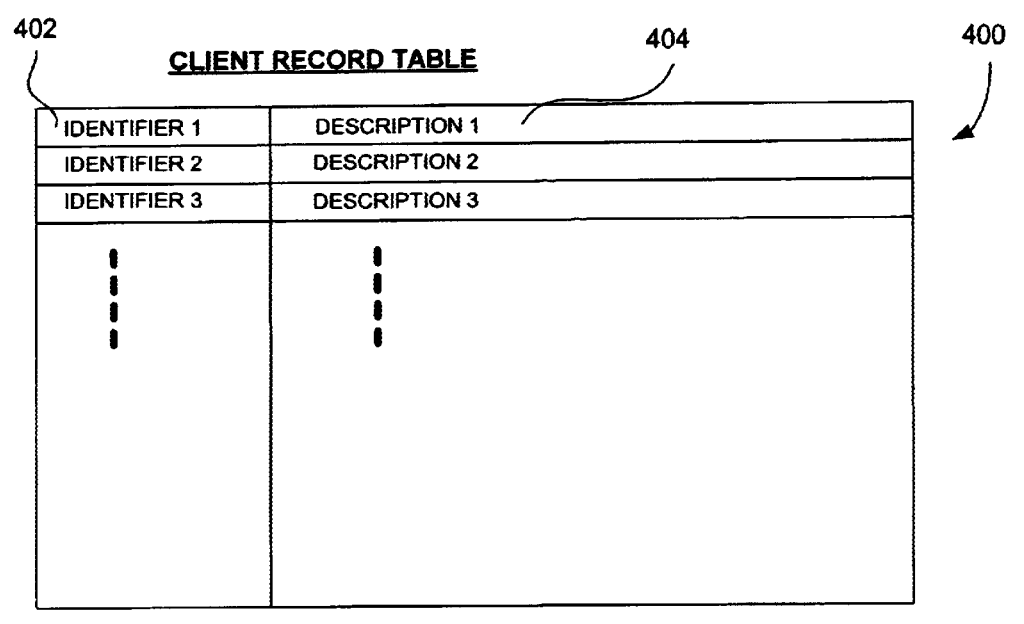

As an option, the information in operation 308 may be retrieved from a record table. FIG. 4 illustrates an exemplary record table 400. As shown, the record table may include a plurality of different identifiers 402. Associated with each of the identifiers 402 are various descriptions, or information, 404 regarding the user which may be utilized during the telephone call by the operators 114. It should be noted that the record table 400 may be used to store information on any group of people including customers, clients, personnel, etc. Further, the record table 400 may include any type of information relating to the users in as many or few fields as desired.

In use, the retrieval of information is based on criterion that is customizable by a company owning the CTI architecture and service desk software, or any other party. In particular, the criterion may specify which identifier is prompted for and received, which information is retrieved using the identifier, the method by which the information is retrieved, and/or any other aspect of retrieving information during a telephone call.

In another preferred embodiment, the retrieved information may be displayed. Further, the information may be depicted based on the customizable criterion. For example, a name and account number may be displayed in a pop-up window during a telephone call. As an option, various pop-up windows may be employed in a customized fashion for displaying the information. In one preferred embodiment, the pop-up windows may be displayed automatically.

Figure 5:
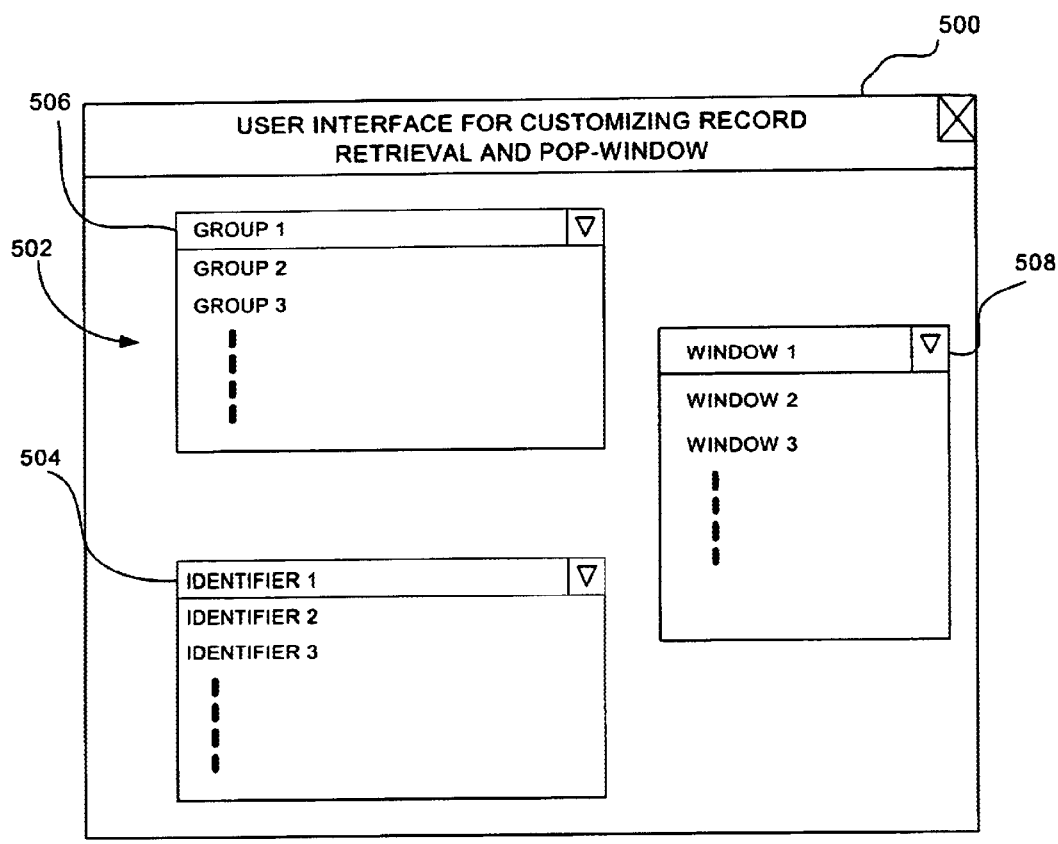
FIG. 5 is an illustration of a graphical user interface that may be used to customize the criterion by which the information is retrieved and displayed.

FIG. 5 is an illustration of a graphical user interface 500 that may be used to customize the criterion by which the information is retrieved and displayed. As shown, various visual tools such as pull-down menus 502, etc. may be employed to facilitate the selection of the customized criterion. A first pull-down menu 504 may be used to allow a user to specify which identifier is used to retrieve the information.

Further, a second pull-down menu 506 may be utilized to select which information is retrieved using the identifier. In one preferred embodiment, the types of information that are retrieved may be predetermined for a plurality of groups. To this end, the user may utilize the second pull-down menu 506 in order to select one of the groups.

For example, it may determined by selecting one of the groups that the switch 102 should retrieve a name, an address, and purchase history information regarding dissatisfied credit card customers during a telephone call based on a telephone number identifier that is identified during the call. In one preferred embodiment, the groups themselves and the criterion associated therewith may be customizable.

The graphical user interface 500 of FIG. 5 may also be used for allowing the user to select criterion that governs the manner in which the information is displayed. For example, various types of pop-up windows with various types of information may be selected using a third pull-down menu 508. By this design, the selected pop-up windows may be displayed when appropriate while interfacing the service desk software application.

Various tools are thus provided for comprehensive customization purposes. By allowing the customization of the retrieval of information during a telephone call, an efficient and cost-effective system is provided for specifically tailoring CTI architecture for use in any particular business environment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for retrieving records, comprising:

receiving a telephone call from a user;

ascertaining an identifier associated with the user during the telephone call;

retrieving information associated with the user utilizing the identifier; and displaying the retrieved information;

wherein the method is customizable utilizing a graphical user interface including:
a first menu for selecting the identifier to be utilized for retrieving the information,
a second menu for selecting a group of users for which the information is retrieved utilizing the identifier, and
a third menu for selecting the manner in which the information is displayed upon being retrieved.

2. The method as recited in claim 1, and further comprising the step of storing the identifier in a database.

3. The method as recited in claim 1, wherein customizable criterion specifies the information that is retrieved using the identifier.

4. The method as recited in claim 1, wherein the information is retrieved from a record table.

5. The method as recited in claim 4, wherein customizable criterion specifies which of a plurality of record tables from which the information is retrieved.

6. The method as recited in claim 1, and further comprising the step of prompting the user to input the identifier based on customizable criterion.

7. The method as recited in claim 1, wherein the identifier includes a social security number.

8. The method as recited in claim 1, wherein the retrieval of records is carried out using computer telephony integration (CTI) architecture.

9. A computer program product for retrieving records, comprising:

computer code for receiving, a telephone call from a user;

computer code for ascertaining an identifier associated with the user during the telephone call;

computer code for retrieving information associated with the user utilizing the identifier; and computer code for displaying the retrieved information;

wherein the computer program product is customizable utilizing a graphical user interface including:
a first menu for selecting the identifier to be utilized for retrieving the information,
a second menu for selecting a group of users for which the information is retrieved utilizing the identifier, and
a third menu for selecting the manner in which the information is displayed upon being retrieved.

10. The computer program product as recited in claim 9, and further comprising computer code for storing the identifier in a database.

11. The computer program product as recited in claim 9, wherein customizable criterion specifies the information that is retrieved using the identifier.

12. The computer program product as recited in claim 9, wherein the information is retrieved from a record table.

13. The computer program product as recited in claim 12, wherein customizable criterion specifies which of a plurality of record tables from which the information is retrieved.

14. The computer program product as recited in claim 9, and further comprising computer code for prompting the user to input the identifier based on the customizable criterion.

15. The computer program product as recited in claim 9, wherein the identifier includes a social security number.

16. The computer program product as recited in claim 9, wherein the retrieval of records is carried out using computer telephony integration (CTI) architecture.

17. A system for retrieving records, comprising:

a switch for receiving a telephone call from a user;

logic for ascertaining an identifier associated with the user during the telephone call; and a service desk software application for retrieving information associated with the user utilizing the identifier;

wherein the system is customizable utilizing a graphical user interface including:
a first menu for selecting the identifier to be utilized for retrieving the information,
a second menu for selecting a group of users for which the information is retrieved utilizing the identifier, and
a third menu for selecting the manner in which the information is displayed upon being retrieved.

18. A method for displaying records, comprising:

receiving a telephone call from a user;

ascertaining an identifier associated with the user during the telephone call;

retrieving information associated with the user utilizing the identifier, the information including a name, an address, and purchase history information; and displaying the retrieved information;
wherein the method is customizable utilizing a graphical user interface including:
a first pull-down menu for selecting the identifier from a group including a social security number, a telephone number, and a credit card number,
a second pulldown menu for selecting a group of users for which the information is retrieved utilizing the identifier, the groups each having predetermined types of information associated therewith, the groups of users further being customizable, and
a third pull-down menu for selecting the manner in which the information is displayed in a plurality of pop-up windows upon being retrieved.

19. The method as recited in claim 18, wherein the display of records is carried out using computer telephony integration (CTI) architecture.

* * * * *